(12) United States Patent  
Stimler et al.

(10) Patent No.: US 7,201,958 B2
(45) Date of Patent: Apr. 10, 2007

(54) POLYMER FOAM PLANK WITH DENSIFIED SKIN, METHOD AND APPARATUS FOR PRODUCING A DENSIFIED SKIN ON A FOAM PLANK

(75) Inventors: Jeffrey J. Stimler, Queensbury, NY (US); David P. Zettel, Marietta, GA (US); Said K. Farha, Lake Forest, IL (US)

(73) Assignee: Pregis Innovative Packaging Inc., Deerfield, IL (US)

( * ) Notice: Subject to any disclaimer, the term of this patent is extended or adjusted under 35 U.S.C. 154(b) by 0 days.

(21) Appl. No.: 10/770,958

(22) Filed: Feb. 2, 2004

(65) Prior Publication Data

US 2004/0157050 A1 Aug. 12, 2004

Related U.S. Application Data

(62) Division of application No. 09/497,348, filed on Feb. 3, 2000, now Pat. No. 6,716,379.

(51) Int. Cl.
*B32B 5/20* (2006.01)

(52) U.S. Cl. .............. 428/318.8; 428/318.6; 428/314.4; 428/314.8

(58) Field of Classification Search .......... 428/318.8, 428/318.6, 314.4, 314.8
See application file for complete search history.

(56) References Cited

U.S. PATENT DOCUMENTS

| | | | | |
|---|---|---|---|---|
| 3,443,007 A | | 5/1969 | Hardy | 264/321 |
| 3,644,168 A | * | 2/1972 | Bonk et al. | 442/213 |
| 3,676,537 A | * | 7/1972 | Winstead | 264/48 |
| 4,089,818 A | | 5/1978 | Slocumb | 260/2.5 HA |
| 4,136,226 A | * | 1/1979 | Gilman | 428/159 |
| 4,216,177 A | | 8/1980 | Otto | 264/2.5 |
| 4,397,797 A | | 8/1983 | Nojiri et al. | 264/45.5 |
| 4,429,061 A | * | 1/1984 | Ide | 521/182 |
| 4,595,436 A | | 6/1986 | Walker et al. | 156/79 |
| 4,747,983 A | * | 5/1988 | Colombo | 264/45.5 |
| 5,059,631 A | | 10/1991 | Hovis et al. | 521/79 |

(Continued)

FOREIGN PATENT DOCUMENTS

| | | |
|---|---|---|
| DE | 43 08 764 A1 | 9/1994 |
| GB | 1 349 301 | 4/1974 |
| JP | 54004964 | 1/1979 |

OTHER PUBLICATIONS

Translation of JP 06-339998, Ingolf et al, "Polyolefin Base Material Particle Foam Molded object Having Compressed Smooth Outer Layer," Dec. 13, 1994.*

(Continued)

*Primary Examiner*—Hai Vo
(74) *Attorney, Agent, or Firm*—Winston & Strawn LLP (57) ABSTRACT

A method and apparatus for making a densified skin polymer foam plank comprising providing a polymer foam having a plurality of cells and heating an outer surface of the foam at a heating station. The heating step collapses and melts the cells adjacent the outer surface to form the densified skin having a density greater than a density of the foam before the heating step. Additionally, the method and apparatus may further include extruding the polymer foam from an extruder.

7 Claims, 2 Drawing Sheets

U.S. PATENT DOCUMENTS

| | | | |
|---|---|---|---|
| 5,277,515 A * | 1/1994 | Hovis et al. | 404/74 |
| 5,350,544 A * | 9/1994 | Bambara et al. | 264/415 |
| 5,369,136 A | 11/1994 | Park et al. | 521/143 |
| 5,658,084 A * | 8/1997 | Wirt | 401/132 |
| 5,665,785 A | 9/1997 | McClellan et al. | 521/51 |
| 5,667,740 A * | 9/1997 | Spydevold | 264/54 |
| 5,683,772 A | 11/1997 | Andersen et al. | 160/36.4 |
| 5,776,388 A | 7/1998 | Andersen et al. | 264/45.5 |
| 5,876,813 A | 3/1999 | Bambara et al. | 428/36.5 |
| 5,882,776 A | 3/1999 | Bambara et al. | 428/21.5 |
| 6,090,479 A | 7/2000 | Shirato et al. | 428/304.4 |
| 6,213,540 B1 * | 4/2001 | Tusim et al. | 296/187.02 |

OTHER PUBLICATIONS

PCT International Search Report dated Mar. 26, 2004—from International Application No. EP 01 91 2679, filed Mar. 26, 2004 (3 pages).

Derwent Abstract of DE patent.

PCT International Search Report dated Jun. 1, 2001—from International Application No. PCT/US01/03102, filed Jan. 31, 2001 (4 pages).

* cited by examiner

POLYMER FOAM PLANK WITH DENSIFIED SKIN, METHOD AND APPARATUS FOR PRODUCING A DENSIFIED SKIN ON A FOAM PLANK

This is a divisional application from U.S. Ser. No. 09/497,348, filed Feb. 3, 2000 now U.S. Pat. No. 6,716,379, now allowed.

FIELD OF THE INVENTION

The present invention relates generally to polymer foam planks and, more particularly, to a foam plank with a densified skin and a method and an apparatus for making the densified skin foam plank.

BACKGROUND OF THE INVENTION

Foam structures are useful as protective packaging. Protective packaging systems have employed foam structures to suspend a product in the center of a container during shipping and storage. For example, foam end caps fit on opposite ends of a product such as a computer, printer, computer monitor, medical monitoring device or other fragile electronic equipment, to protect the product from shock and vibration damage. In general, protective packaging foams are low density polymeric materials with good physical properties capable of supporting the product weight without excess deformations during package transit and storage. The exact foam density required for a particular application depends on the foam compression properties, shear properties, shock mitigation properties during package drops, creep properties, buckling limits, and thickness resiliency with multiple drops.

Laminated foam structures have been developed that provide enhanced foam physical properties and/or simplify the creation of fabricated end caps for protective packaging systems. Some laminated foam structures comprise a low density foam core with one or more layers, and one or more skins of high density foam laminated to the core. U.S. Pat. Nos. 5,876,813 and 5,882,776 describe examples of such laminated foam structures. In addition, other laminated foam structures may comprise a low density foam core with one or more layers, and one or more skins of thin polymeric film or polymeric sheet. These laminated foam structures provide the desired property enhancements.

Conventional lamination techniques produce the laminated foam structures, including the techniques of bonding the layers using heat, film, or applied adhesives. One problem with the laminated foam structures is their cost and inefficiency of production. The lamination process for the laminated foam structures first requires the production and stocking of various rolled foam sheet materials or individual foam planks having different properties, densities, dimensions, and colors. These foam materials, after a curing time, are then laminated on separate lamination equipment to form the finished product. Laminated foam structures with polymeric films and/or sheets also require a separate production process. Often, polymeric films and sheets are produced off-site from the foam and laminate production location. Therefore, film rolls and sheets must be transported to the lamination plant. Another problem with the conventional lamination techniques is that an inventory of component foams, films and/or sheets must be maintained to meet manufacturing scheduling. Furthermore, all component materials must be inspected and certified to meet quality and product specifications on an individual basis before being used at the lamination production stage.

Thus, there is a need to develop foam structures having enhanced properties. There is also a need to manufacture these foam structures with a relatively simple production process that does not have the inefficiencies and complexities associated with the conventional laminated product production processes. The present invention is directed at satisfying these needs.

SUMMARY OF THE INVENTION

In accordance with one aspect of the present invention, there is provided a method for making a densified skin polymer foam plank. The method comprises providing a polymer foam having a plurality of cells and heating an outer surface of the foam. The heating step collapses and melts the cells adjacent the outer surface to form the densified skin having a density greater than a density of the foam before the heating step. Additionally, the method further includes a step of extruding the polymer foam from an extruder. Prior to extruding the foam, the method may further include the steps of mixing and melting a polymer mixture comprising at least 50 weight percent low density polyethylene, mixing the mixture with one or more blowing agents, cooling and pressurizing the mixture.

In accordance with another aspect of the present invention, there is provided an apparatus for making a densified skin foam plank. The apparatus comprises a heating station capable of heating an outer surface of an ethylene polymer foam plank to form a densified skin. The densified skin has a density at least ten times the density of the ethylene polymer foam before the heating. The heating station may comprise hot air knives. The apparatus may further include an extruder capable of producing the ethylene polymer foam out of an extrusion die. The extruder may be in-line with the heating station to continuously or intermittently provide the ethylene polymer foam to the heating station.

In accordance with a further aspect of the present invention, there is provided a densified skin ethylene polymer foam plank. The plank comprises a low density ethylene polymer foam having dimensionally stable closed cells. The plank also includes a densified skin on a top surface of the foam. The densified skin comprises melted and collapsed foam cells formed by heating the top surface of the foam.

BRIEF DESCRIPTION OF THE DRAWINGS

The foregoing and other advantages of the invention will become apparent upon reading the following detailed description and upon reference to the drawings in which.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Figure 1:
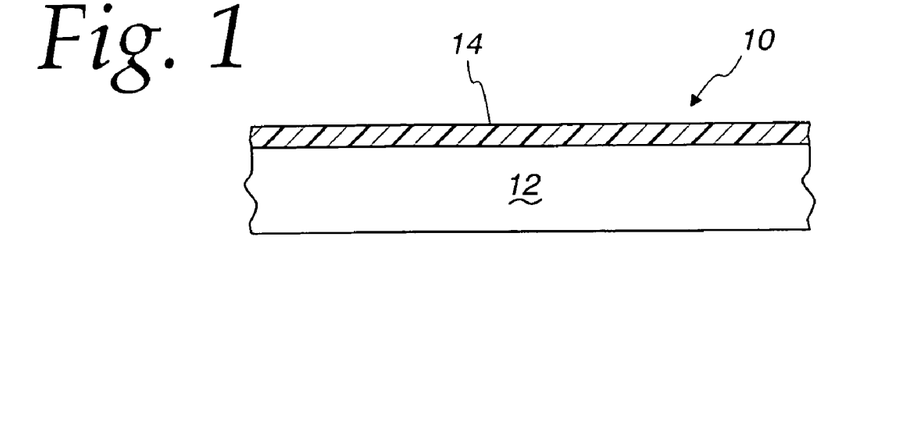
FIG. 1 is a cross section of the foam plank having a densified skin embodying the present invention.

Turning now to the drawings and referring initially to FIG. 1, there is depicted a polymer foam plank 10 according to the present invention. The foam plank 10 includes a core 12 and a densified skin 14. In one embodiment, the core 12 comprises a stable closed cell ethylene polymer foam with a density between 0.9 and 5.0 lb/ft$^3$. In an another embodiment, the core 12 may comprise more than one foam layer with all of the layers having approximately equal densities. The densified skin 14 comprises the same polymer foam as the core 12, but the skin 14 has a density greater than the density of the core 12. The densified skin 14 typically will have a density sufficient to provide the desired physical properties described below. For example, the density of the skin 14 may have a range of a density slightly greater than the density of the foam core 12 to a density equal to the density of the solid polymer from which the foam plank is produced. In some embodiments, the density of the skin 14 is at least ten times the density of the foam core 12. The densified skin 14 is formed by exposing a foam plank or sheet to a heat source, as will be described in detail in connection with FIG. 4. For example, exposing the foam core to heat of sufficient temperature and duration will densify the foam nearest to the heat application through cell melting and cell collapse resulting in the foam plank 10 of the present invention.

In one embodiment, the foam plank 10 may have a thickness greater than 1.0 inches. The thickness of the densified skin 14 may range from about 12.5 mils to 100 mils. In other embodiments, the core 12 and skin 14 may have a wide range of possible thicknesses dependent upon the initial amount of the foam core 12 thickness that is reduced by the heat exposure into the densified skin 14 and the final density of the densified skin 14. In most embodiments of the present invention, the foam plank 10 is less than 4 inches in thickness with the densified skin 14 having an approximate thickness range of between 12.5 and 30 mils. Additionally, the density of the densified skin 14 is typically greater than 50% of the solid polymer density from which the foam core 10 is produced.

Figure 2:
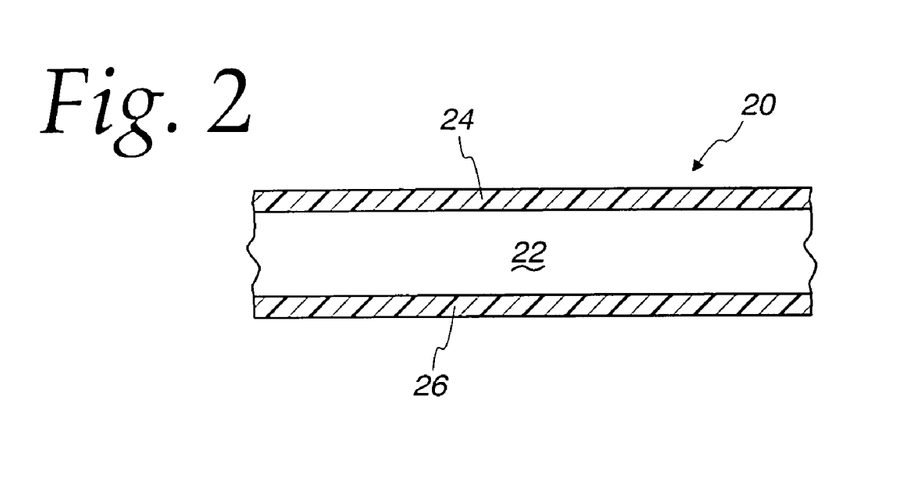
FIG. 2 is a cross section of a foam plank having a pair of densified skins.

FIG. 2 depicts a polymer foam plank 20 according to another embodiment of the present invention. In this embodiment, the foam plank 20 includes a core 22 sandwiched between an top densified skin 24 and a bottom densified skin 26. Similar to the embodiment depicted in FIG. 1, the core 22 comprises a stable closed cell ethylene polymer foam having a density between 0.9 and 5.0 lb/ft$^3$. The skins 24 and 26 comprise the same polymer foam as the core 22 but the skins 24 and 26 have a density greater than the density of the core 22. The skins 24 and 26 are formed by exposing the plank to a heat source of sufficient temperature and duration to density the foam nearest the heat application, as will be described in detail in connection with FIG. 4. The densified skins 24 and 26 typically will have a density sufficient to provide the desired physical properties described below. For example, the density of the skins 24 and 26 may have a range of a density slightly greater than the density of the foam core 22 to a density equal to the density of the solid polymer from which the foam plank is produced. In some embodiments, the density of the skins 24 and 26 is at least ten times the density of the foam core 22. In one embodiment, the foam plank 20 may have a thickness greater than 1.0 inches. The thickness of the densified skins 24 and 26 may range from about 12.5 mils to 100 mils. In other embodiments, the core 22 and skins 24 and 26 may have a wide range of possible thicknesses dependent upon the initial amount of the foam core 22 thickness which is reduced by the heat exposure into the densified skins 24 and 26 and the final density of the densified skins 24 and 26. In most embodiments of the present invention, the foam plank 20 is less than 4 inches in thickness, the densified skins 24 and 26 are between 12.5 and 30 mils in thickness, and the density of the densified skins is greater than 50% of the solid polymer density from which the foam core 20 is produced.

The densified skin foam planks 10 and 20 have enhanced physical properties as compared to foam planks without densified skins. The densified skin foam planks 10 and 20 generally provide increased compression strength and modulus, improved cushioning performance, increased tear resistance, improved thermal stability, increased tensile toughness, and decreased compression creep compared to foam exceed 1000 lb/hr to produce an expanded and dimensionally stable closed cell ethylene polymer foam 44. The foam 44 has a density between 0.9 and 5.0 lb/ft$^3$ and a thickness of at least 1.0 inch.

Figure 4:
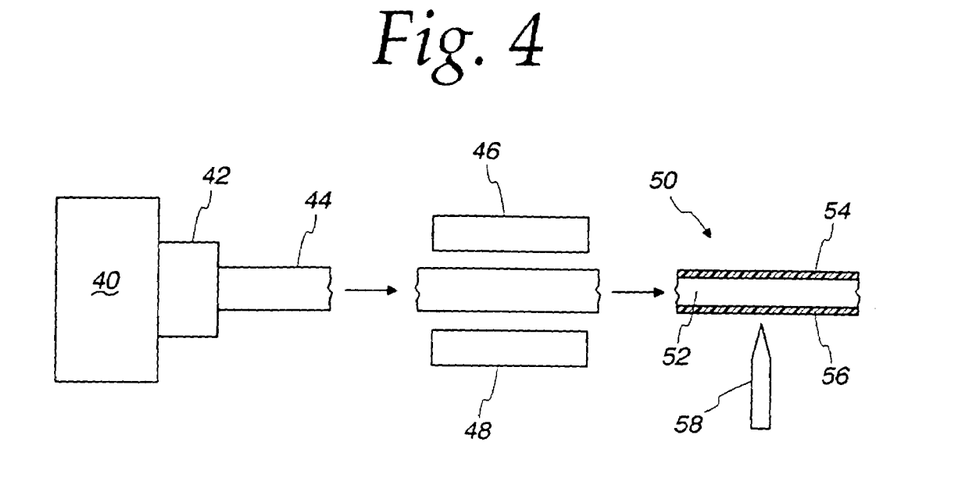
FIG. 4 is a simplified process diagram of the method for producing the foam plank of FIG. 2.

Once the foam 44 has been extruded from the die 42, the foam 44 passes to heating stations 46 and 48 as depicted in FIG. 4. The heating source of the heating stations 46 and 48 is heated air, infrared heaters, or other conventionally known heating sources that can provide the desired skin densification. Combinations of various heating devices also work under the present invention. In the illustrated embodiment of FIG. 4, the foam plank 44 is heated on both sides. However, the foam plank 44 can be optionally exposed to heat on only one side in other embodiments.

Figure 5:
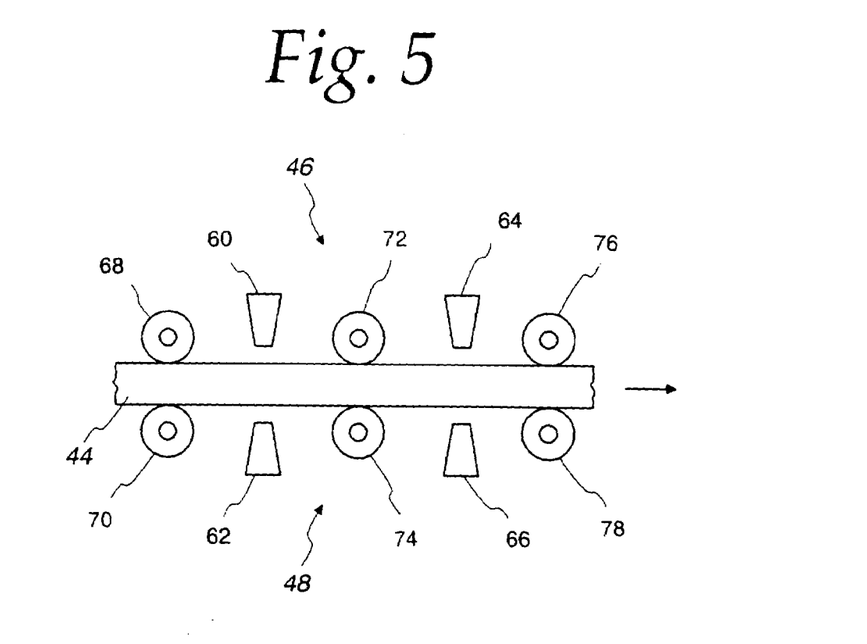
FIG. 5 is a side view of one embodiment of a heating station.

In the embodiment illustrated in FIG. 5, the heating stations 46 and 48 include a series of one or more temperature controlled heated air knives 50, 52, 54 and 56. Rollers 58, 62 and 66 form a pressure regulated nip point with other rollers 60, 64 and 68, or a driven belt, and are positioned at the in-feed and/or out-feed of the heating stations 46 and 48, and optionally, between any two or more individual heated air knives. In one embodiment, these rollers 58–68 are temperature controlled to prevent the heated densified foam skin from sticking to the surfaces of the rollers 58–68.

Prior to entering the heating stations 46 and 48, the foam 44 is allowed to stabilize for a period of time. For stabilization, the foam 44 is held for approximately 30 seconds and preferable for 2 to 5 minutes prior to exposure to the heating stations 46 and 48. This delay allows for good stabilization of the foam 44 following extrusion but maintains the plank core temperature above ambient conditions allowing the skin densification process to be more efficient. In other embodiments, the extruded foam plank 44 may age for an extended time period prior to exposure to the heating stations 46 and 48. For the aged foam planks, the foam 44 can be fed to an planks without densified skins. The low density core 12 and 22 contributes to a low total weight of the plank 10 and 20, while the high density skins 14, 24 and 26 provide aesthetic improvement and improved physical properties. Additional benefits of densified skin foam plank 10 and 20 are a more durable and smoother surface, improved wear resistance, increased flexural stiffness, and improved die cutting characteristics.

Figure 3:
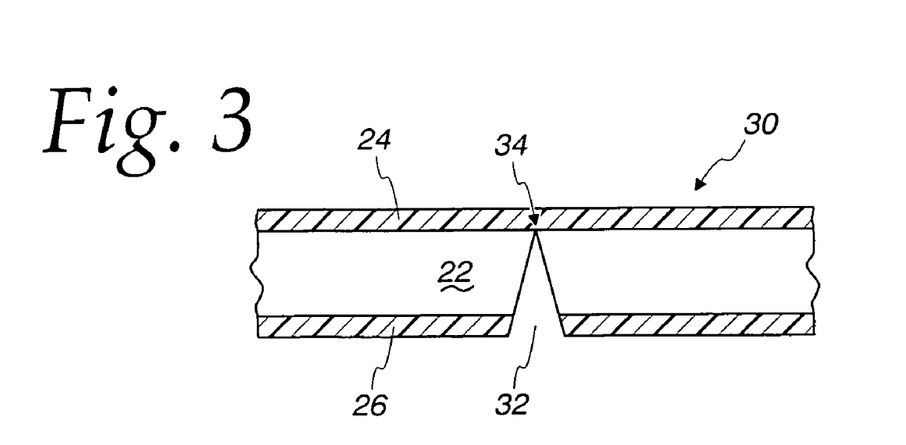
FIG. 3 is a cross section of the foam plank of FIG. 2 having a hinge.

The densified skin foam plank 10 and 20 with enhanced properties is ideal for protective packaging. In addition, the densified skin foam plank 10 and 20 may be used in exercise equipment, such as gym mats, water sports, such as bodyboards, and construction applications. In one embodiment, the densified foam plank 20 may be die cut for protective packaging applications. As illustrated in FIG. 3, a densified foam plank 30 includes a slit 32 extending through the bottom skin 26 and the core 22 but not through the top skin 24 forming a hinge 34.

Because of the densified skin layer 24, the hinge 34 has good mechanical strength in tension and shear, thereby having utility in collapsible packing members. In such collapsible packing systems, a densified foam plank 20 is die cut such that one or more portions of the plank can rotate from a flat storage position around the hinge 34. Once rotated, the individual functional portions of the die cut foam plank form 30 an integral end cap suitable for the protective packaging of electronic and other consumer goods. Therefore, die cutting and slitting the densified foam plank 30 provides a wide variety of protective packaging applications.

In other embodiments, the slit 32 may only extend partially through the core 22 or the slit may extend partially through the top skin 24. Die cutting or slitting exactly to the densified top skin 24 is generally preferred. This "slit to skin" technique provides a design guide for cutting blades to ensure repeated production off-line heating station assembly similar to that described above in conjunction with FIG. 4.

The speed of the foam 44 passing though the heating stations 46 and 48 is regulated to control the residence time exposure to the heating source. When the foam 44 is exposed to heat at the heating stations 46 and 48 the outermost cellular region of the foam 44 densifies to form a densified skin plank 50. During the densification process, the outermost cells of the foam 44 soften, melt and collapse to form an increasingly thick layer of densified foam and/or partially voided solid polymer at the surface of the foam plank 44. Increasing the time duration and exposure temperature can, to a point, increase the thickness of the skins 54 and 56 as well as their density. Increasing the thickness and density of the skins 54 and 56 is limited by the heat transfer rate through the increasingly thick skin layer to the cellular foam below. For this reason, densification of foam plank 44 whose core is still warm, such as that produced with the foam extrusion process in line with the heating stations 46 and 48 as shown in FIG. 4, is generally preferred because the heat transfer is maximized. The temperature controlled rollers 68–78 and their pressure regulated nip force also assist in controlling the density and smoothness of the densified skin.

Once the foam 44 has been exposed to the heating stations 46 and 48, the foam is a densified skin foam plank 50. The plank 50 includes a low density core 52 having a density equivalent to the density of the extruded foam 44. The plank 50 also includes top and bottom skins 54 and 56 having higher densities than the density of the core 52. In one embodiment, the skins 54 and 56 have densities between ten times the density of the foam core 52 and the density of the solid polymer from which the plank 44 was produced. The thickness of the top and bottom skins 54 and 56 range from 12.5 to 100 mils. The plank 50 is similar to the plank 30 of FIG. 2. To form a plank having only one densified skin as shown in FIG. 1, either the upper heating station 46 or lower heating station 48 but not both densifies one of the two skin surfaces of the foam plank 44.

In the embodiment illustrated in FIG. 5, the heating stations 46 and 48 include a series of one or more temperature controlled heated air knives 60, 62, 64 and 66. Rollers 68, 72, and 76 form a pressure regulated nip point with other rollers 70, 74 and 78 or a driven belt are positioned at the in-feed and/or out-feed of the heating stations 46 and 48, and optionally, between any two or more individual heated air knives. In one embodiment, these rollers 68–78 are temperature controlled to prevent the heated densified foam skin from sticking to the surfaces of the rollers 68–78.

In this description, the term "polyolefinic resin (polymer or material)" is meant to include polymers of linear or branched $C_2$ to $C_8$ hydrocarbon molecules that contain one double bond in its structure including alkenes such as ethene, propene, 1-butene, 2-butene, 1-pentene, 2-pentene, and 3-pentene. Generally preferred polyolefinic materials include polymers of ethene, which are commonly known as polyethylene. Broadly, the invention involves a method for preparing closed cell ethylene polymer foams with densities between 0.9 and 5.0 lb/ft$^3$ densities, thicknesses greater than 1.0 inch, with one or more densified skins formed from the closed cell ethylene polymer foam. A closed cell foam can be defined as one with fewer than 15% open cells, as determined by water absorption tests or air pyrometer measurements. The densified skins of the ethylene polymer foam typically have densities that range from ten times the density of the ethylene polymer foam core to slightly less than the density of the solid ethylene polymer from which the foam core was produced. Furthermore, the densified skins are from 12.5 to 100 mils in thickness, dependent upon the density of the densified skins and the amount of original ethylene polymer foam thickness densified into densified skins.

The ethylene polymer resin that is used to produce the foams of the present invention can be those obtained by polymerizing ethylene, or polymerizing ethylene with other aliphatic polyolefins such as propylene, 1-butene, 1-pentene, 3-methyl-1-butene, 4 methyl-1-pentene, 4 methyl-1-hexene, or 5-methyl-1-hexene alone, or with mixtures thereof, or with various other polymerizable monomers. Ethylene polymers include homopolymers of ethylene and copolymers of ethylene and other ethylenically unsaturated monomers having from three to about eight carbon atoms including propylene, butenes, pentenes, hexenes, and the like. The copolymers can include other monomers compatible with ethylene. Generally preferred are medium density polyethylene (MDPE), low density polyethylene (LDPE), and linear low density polyethylene (LLDPE). Such polyethylenes are described in *the Kirk Othmer Encyclopedia of Chemical Technology*, Third Ed., Vol. 16, pages 385, 420; the *Modern Plastics Encyclopedia* (1986–87), pages 52–63; and the *Encyclopedia of Polymer Science and Technology*, Vol. 7, page 610.

The term "ethylene polymer (resin or material)", as used herein, is meant to include not only homopolymers of ethylene, but also ethylene copolymers composed of at least 50 mole percent (preferably at least 70 mole percent) of an ethylene unit and a minor portion of a monomer copolymerizable with ethylene. In addition, the term "ethylene polymer" includes blends of at least 50 percent by weight of an ethylene homopolymer with another polymer or blend of polymers.

Generally preferred ethylene polymers include non-crosslinked, low density polyethylene having a density of about 0.915 to 0.930 kg/m$^3$ and a melt flow rate in the range of about 0.1 to 6.0 grams per 10 minutes, as measured using ASTM D1238 at 190° C. and 689.5 kPa load. More preferred in the present invention are blends of low density polyethylene (LDPE), recycled LDPE and/or recycled ethylene polymer, other ethylene polymers and copolymers, and other non-olefinic hompolymers and copolymers.

The recycled LDPE in the mixture may be post consumer or a stream of LDPE foam from a commercial fabricator of protective packaging. While LDPE recycle is generally preferred, recycle containing whole or partial fractions of other ethylene polymers is also permissible. The LDPE recycle in the present invention may range from 0 to 100 percent by weight of the resin composition used to produce a densified skin plank.

Permissible copolymer content may range from 0 to 40 percent by weight of the total resin composition and is selected from a list including, but not limited to, saturated and unsaturated styrene-butadiene random and block copolymers rubbers, ethylene vinyl acetate (EVA), ethylene acrylic acid (EAA), ethylene methacrylic acid (EMAA), ethylene vinyl alcohol (EVOH), ethylene propylene diene monomer copolymer rubbers (EPDM), ethylene-propylene copolymers, styrene-ethylene copolymers and interpolymers, ethylene ethyl acrylate (EEA) and ethylene methyl acrylate (EMA).

Formulation blends with other homopolymers and copolymers are also acceptable as long as the total LDPE content exceeds 50 weight percent of the total resin composition. Acceptable homopolymers and copolymers include, but are not limited to polystyrene, polyamides, polyolefin elastomers and plastomers, polypropylene, medium density polyethylene (MDPE), high density polyethylene (HDPE), linear low density polyethylene (LLDPE), and olefinic ionomers.

The nucleating agent, or cell size control agent, can be any convenient or useful nucleating agent(s). The cell size control agent is preferably used in amounts of 0.1 to 2.0 weight percent, depending upon the desired cell size and based upon the weight of the polyolefinic resin. Examples of the cell size control agent are inorganic materials such as clay, talc, silica, and diatomaceous earth. Other examples include organic cell size control agents which decompose or react when heated in the extruder to evolve nitrogen or carbon dioxide gas, such as azodicarbonamide, hydrocerol, etc. Generally preferred nucleating agents are talc, silica, or a stoichiometric mixture of citric acid and sodium bicarbonate. Mixtures of cell size control agents may be used. Other additive concentrates and materials may also be added to the extruder with the ethylene polymer feed including antioxidants, color pigments, UV additives, and antistatic agents.

Permeation modifiers may be used in the foamable composition of the invention to prevent collapse of the cellular structure within the first twenty-four hours following extrusion. Permeation modifiers are also called aging modifiers in some polyolefinic extrusion art. Generally preferred aging modifiers include fatty acid esters such as glycerol monostearate.

The physical blowing agents used for the present invention include organic and inorganic blowing agents. Permissible organic blowing agents included $C_2$ to $C_5$ aliphatic hydrocarbons, such as ethane, propane, n-butane, isobutane, n-pentane, isopentane, and neo-pentane. Permissible organic blowing agents also include halogenated hydrocarbons including HFC's HCFC's and CFC's. Examples of the halogenated hydrocarbon blowing agents include 1,1,1,2,2-pentafluoroethane (HFC-125), 1,1,1,2-tetraflouroethane (HFC-134a), 1-chloro-1,2-difluoroethane (HCFC-142b), 1,1,1-trifluoroethane (HFC-143a), and 1,1-difluoroethane (HFC-152a). Permissible inorganic blowing agents include inorganic and inert gases at room temperature such as nitrogen, argon, and carbon dioxide.

Referring to FIG. 4, in one embodiment the foam plank 44 can be produced from a process comprising the steps of: feeding an ethylene polymer into an extruder 40; adding a nucleating agent to the resin feed; optionally adding a permeation modifier to the resin feed; optionally adding other additives such as color pigments, etc. to the resin feed; plasticating the mixture in an extruder, 40, to form a polymeric melt; incorporating an organic or inorganic blowing agent, or combinations thereof, into the polymer melt; optionally injecting a liquefied permeation modifier into the polymer melt; uniformly mixing and cooling the foamable composition to a temperature effective for the expansion of the ethylene polymer foam; and extruding or ejecting the foamable composition through a die 42 at a sufficient high rate to form a closed cell polyolefinic foam.

The present invention may implement a continuous plank extrusion process or an intermittent accumulating extrusion process. The foamable composition can be used in an extrusion process operated on a continuous basis using a conventional extruder system. The continuous process for polyolefinic foams can produce foam of any thickness, but generally less than 4 inches in thickness at a 24-inch width. The intermittent accumulating extrusion process is generally used for large cross-section polyolefinic foams with thicknesses greater than 1.0 inches. The two processes have similar extrusion conditions, but differ slightly in preferred composition. In both processes, the foam plank 44 is produced by extruding the foamable composition through a die 42 at instantaneous rates greater than 1000 lb/hr. The foam plank 44 used in the present invention has a density between 0.9 and 5.0 lb/ft$^3$ and a thickness greater than 1.0 inch, but generally less than 4.0 inches.

Referring to FIG. 4, in one embodiment the foam plank 44 is made into a densified plank 50 a process comprising the steps of: conveying the plank 44 to heating stations 46 and 48 following a minimum stabilization time period after extrusion; exposing the foam plank 44 to a single or multi-zone temperature controlled heat source on at least one side for a specified time duration controlled by regulating the speed of the plank through the heating stations; passing the foam plank 44 under one or more temperature controlled pressure regulated nip rollers in close proximity to the heating zones; and optionally conveying the densified skin plank 50 to a cutting station 58 that is separate from, directly attached to, or integral with the heating station assembly.

Referring to FIG. 4, the heating stations 46 and 48 may consist of a single or multiple temperature controlled heating source zones. The heating source is heated air from temperature controlled hot air knives, infrared heaters of sufficient watt density, or other conventionally known heating sources that can provide the desired skin densification. Combinations of various heating devices can be used within a given heat source zone, or as a distinct heat source zone unto itself.

In one embodiment of the present invention, the heating source zones are temperature controlled hot air knives

60–66. The discharge knife nozzle design provide a uniform exit flow velocity across the width of the knife. The nozzle discharge temperature is controlled at a temperature greater than 4000° F. The autoignition temperature of the blowing agent used to produce the foam, if the blowing agent is flammable, limits the maximum nozzle discharge temperature. The width of the nozzle is equal to or greater than the width of the foam plank 44 whose skin is being densified. It is also acceptable to position nozzles, whose width is less than the width of the foam plank, side by side to provide the desired plank width coverage. The distance of the heating nozzle from the foam plank 44 being densified can vary depending on the volumetric flow rate and exit velocity of the hot air through the nozzle. In one embodiment of the present invention, the distance of the nozzle from the foam plank 44 being densified is less than 1.0 inch.

As described above for one embodiment of the heating stations, rollers 68–78 form a pressure regulated nip point with other rollers or a driven conveyor belt and are positioned at the in-feed and/or out-feed of the heating station assembly. Additionally, rollers 68–78 may form for the nip point between any two or more individual heated air knives 60–66 or other heating source zones. In one embodiment of the present invention, these rollers 68–78 are controlled at a temperature below the melting point of the ethylene polymer used to produce the densified plank 50. The roller nip pressure is regulated to provide sufficient normal force to the foam plank 44 to improve the resulting surface smoothness of the densified foam plank 50 and to assist in the skin densification of the foam plank without crushing or distorting the foam core 52.

Prior to entering the heating stations 46 and 48, the freshly extruded foam plank 44 is allowed to stabilize for a period of time. In one embodiment, the foam 44 is held for a minimum of 30 seconds prior to exposure to the heating stations 46 and 48. In another embodiment, the stabilization time is between 2 and 5 minutes after the foam plank exits the die. For continuously extruded foam plank, this is accomplished by providing a conveying length of sufficient distance to give the desired residence time between the die exit and entrance to the heating stations 46 and 48. For the intermittent accumulating extrusion system, the stabilization time is provided by holding the ejected foam plank 44 in a forming table for a time period up to the cycle time of the plank ejection.

In another embodiment of the present invention, the extrusion process 40 for the foam plank 44 is separated off-line from the heating stations 46 and 48. In this configuration, the freshly extruded foam plank 44 is aged off-line anywhere from 5 minutes to many weeks. The aged plank is then fed into the heating station assembly 46 and 48 in a separate unit operation step. Generally, the separated process is less preferred due to the extra handling of the foam plank. In addition, the retained heat in the foam core 52 is lost resulting in a less efficient densification process. As discussed above, feeding the foam plank 44 directly to the heating stations 46 and 48 has been found to improve the efficiency of the skin densification and increase the maximum obtainable skin thickness.

Skin densification of the foam plank 44 is primarily determined by heat input to the plank, the nip force used to compress the foam nearest the surface after softening by the heat, and the heat transfer rate through the foam and densified skin as the skin is densified. In one embodiment of the present invention, heat input is controlled by the temperature and volumetric flow rate of the hot air supplied through the nozzles, the number of nozzles utilized, and the axial speed of the plank as it passes under each nozzle or heating zone. Typical line speeds are 5 to 40 ft/min, depending on the extrusion rate, plank dimensions, and foam density being produced. In one embodiment of the present invention utilizing an intermittent accumulating extrusion process, the foam plank velocity through the heating stations 46 and 48 is controlled at the lowest speed possible that allows the plank on the forming table to exit just before the next foam plank is ejected from the accumulating extrusion system.

The heat transfer rate through the thickening densified skin layers 54 and 56 becomes the limiting factor for determining the final skin thickness of the densified skin foam plank 50. A limit is reached after which it is no longer possible to heat the foam core 52 to create additional skin thickness. The heat transfer rate is determined by the densified skin thickness, the densified skin density, and the initial density of the foam plank 44. One observed practical upper limit for skin densification is that the maximum thickness loss of the foam plank 44 during densification is 1.0 inch per side heated for a 2.0 lb/ft$^3$ initial foam density. Typically, the total thickness loss of the foam plank 44 during densification is between 0.25 and 0.5 inch per side heated.

Upon exiting the heating stations 46 and 48, the foam is a densified skin foam plank 50. The plank 50 includes a low density core 52 having a density equivalent to the density of the extruded foam 44. In addition, the densified skin foam plank 50 includes densified skins 54 and 56 on the top and bottom, or optionally, a densified skin on one side only. The skins 54 and 56 have higher densities than the density of the core 52. In one embodiment, the skins 54 and 56 have densities between ten times the density of the foam core 52 and the density of the solid ethylene polymer from which the plank 44 was produced. The densified skin density can be determined by buoyancy force during immersion in water, or by measuring the weight of a given area and thickness of densified skin. The thickness of the densified skins 54 and/or 56 range from 12.5 to 100 mils. Skin thickness is measured by skiving the densified skin away from the foam core and using a ratchet style Mitutoyo digital micrometer with a ¼" flat foot, or equivalent alternative thickness measuring device. For reference purposes, the foam plank 44 is extruded with thin skins. The maximum skin thickness obtained by varying extrusion conditions and the temperature of the die 42 has been 7 mils. Generally, the skin thickness of the extruded foam plank 44 is less than or equal to 5 mils.

The densified skin foam plank 50 has enhanced properties in comparison to planks without densified skins. An illustrative comparison of properties for a plank sample having a densified skin on one side compared to a plank sample having no densified skins is shown in Table 1 below. Details for the preparation of the densified skin plank sample are given in Example 1 of the present invention.

TABLE 1

ILLUSTRATIVE PROPERTY COMPARISON

| TEST PERFORMED | Example 1 With Densified Skins | No. of Samples | Standard Deviation | Example 1 Without Densified Skins | No. of Samples | Standard Deviation |
|---|---|---|---|---|---|---|
| Density (pcf) | 2.28 | 3 | 0.036 | 2.15 | 3 | 0.030 |
| Cell Count (cpi) | | | | | | |
| Near Densified Skin | | | | | | |
| CMD | 21.3 | 3 | 1.155 | N/A | | |
| MD | 21.3 | 3 | 1.155 | N/A | | |
| Middle | | | | | | |
| CMD | 21.3 | 3 | 1.155 | 19.3 | 3 | 1.155 |
| MD | 21.3 | 3 | 1.155 | 23.3 | 3 | 1.155 |
| Compression Strengths (psi) | | | | | | |
| @ 25% Deflection | | | | | | |
| @ 50% Deflection | | | | | | |
| Vertical | 7.70 | 3 | 0.099 | 5.68 | 3 | 0.231 |
|  | 15.50 | 3 | 0.244 | 12.20 | 3 | 0.509 |
| Horizontal | 8.23 | 3 | 0.068 | 8.68 | 3 | 0.278 |
|  | 15.51 | 3 | 0.160 | 15.67 | 3 | 0.387 |
| Extruded | 9.08 | 3 | 0.079 | 8.09 | 3 | 0.233 |
|  | 16.56 | 3 | 0.116 | 14.95 | 3 | 0.518 |
| Compression Strength 3D Summary (psi) | | | | | | |
| @ 50% Deflection | 47.57 | 3 | 0.609 | 42.82 | 3 | 1.83 |
| Compression Modulus (psi) | | | | | | |
| Vertical | 59.11 | 3 | 0.161 | 46.63 | 3 | 1.52 |
| Horizontal | 48.52 | 3 | 0.672 | 45.27 | 2 | 1.53 |
| Extruded | 49.67 | 3 | 0.287 | 46.39 | 3 | 0.780 |
| Skin Thickness (inches) | 0.0190 | 7 | 0.0014 | 0.0050 | 7 | 0.0007 |
| Thermal Stability (% change) | | | | | | |
| cmd | −4.0 | 1 | N/A | −4.1 | 1 | N/A |
| md | −1.8 | 1 | N/A | −5.7 | 1 | N/A |
| thickness | −18.1 | 1 | N/A | −27.5 | 1 | N/A |
| weight | −3.7 | 1 | N/A | −4.3 | 1 | N/A |
| Compression Creep @ 1 wk. (% loss) | | | | | | |
| @ 2.0 psi loading | | | | | | |
| Vertical | 0.55 | 3 | 0.262 | 2.14 | 3 | 0.119 |
| Horizontal | 1.49 | 3 | 0.136 | 1.51 | 3 | 0.110 |
| Extruded | 1.11 | 3 | 0.075 | 1.26 | 3 | 0.116 |
| Tensile Strength (psi) | | | | | | |
| cmd | 29.8 | 5 | 0.496 | 27.1 | 5 | 1.59 |
| md | 39.5 | 5 | 0.900 | 25.8 | 5 | 0.729 |
| Tensile Strength (lbs force) | | | | | | |
| cmd | 7.23 | 5 | 0.191 | 6.50 | 5 | 0.607 |
| md | 9.55 | 5 | 0.236 | 6.56 | 5 | 0.194 |
| Tensile Modulus (psi) | | | | | | |
| cmd | 165.0 | 5 | 9.20 | 178.1 | 5 | 25.3 |
| md | 241.2 | 5 | 21.9 | 142.1 | 5 | 7.43 |
| Tensile Elongation (%) | | | | | | |
| cmd | 79.0 | 5 | 9.6 | 55.2 | 5 | 5.8 |
| md | 87.3 | 5 | 13.0 | 68.0 | 5 | 12.8 |
| Dynamic Cushioning (G's) Average of 2$^{nd}$–5$^{th}$ Drops | | | | | | |
| 1.0 psi static load | 42.0 | 1 | N/A | 43.5 | 1 | N/A |
| 2.0 psi static load | 62.5 | 1 | N/A | 68.3 | 1 | N/A |

Compression properties, thermal stability, density, and compression creep are all tested according to ASTM D3575. Tensile properties are tested according to ASTM D412. Dynamic cushioning performance is tested according to ASTM D 1596, with the densified skin oriented parallel to the drop direction. "MD" refers to machine or extrusion direction. "CMD" refers to cross-machine or transverse direction. In general, the foam plank with one densified skin has higher compression strengths, higher three dimensional compression strength summary, increased compression modulus, improved thermal stability, increased tensile strength, increased tensile modulus, increased tensile elongation, and improved dynamic cushioning performance compared to foam plank without densified skins.

The densified skin foam plank 50 having enhanced properties also compares well to laminated foam structures comprising one or more skins of high density foam sheet laminated to a core of one or more layers of low density foam, as detailed in U.S. Pat. Nos. 5,876,813 and 5,882,776. However, the densified skin foam plank 50 of the present invention can be produced utilizing an in-line single step process without the handling complexities and associated higher costs of traditional multi-step laminated product production processes. An illustrative summary of properties of the foam plank sample having one densified skin detailed in Example 1, compared to a multi-density foam sheet laminate (MDL) comprising a 0.125" thick, 6 lb/ft$^3$ foam sheet laminated to a two inch thick 1.7 lb/ft$^3$ LDPE four layer foam core, is shown in Table 2 below.

TABLE 2

ILLUSTRATIVE PROPERTY SUMMARY VS. MDL

| TEST PERFORMED | Example 1 With Densified Skins | MDL Pat. No. 5,876,813 |
|---|---|---|
| Density (pcf) | 2.28 | Skin 6.91 pcf |
| | | 1.90 |
| Cell Count (cpi) | | |
| Skin Layer | | |
| cmd | N/A | 28 |
| md | N/A | 28 |
| Middle | | |
| cmd | 21.3 | 20 |
| md | 21.3 | 22 |
| Compression Strengths (psi) | | |
| @ 25% Deflection | | |
| @ 50% Deflection | | |
| Vertical | 7.70 | 4.63 |
| | 15.50 | 12.01 |
| Horizontal | 8.23 | 6.35 |
| | 15.51 | 10.68 |
| Extruded | 9.08 | 9.92 |
| | 16.56 | 13.64 |
| Compression Strength 3D Summary (psi) @ 50% Deflection | 47.57 | 36.33 |
| Compression Modulus (psi) | | |
| Vertical | 59.11 | 60.24 |
| Horizontal | 48.52 | 53.60 |
| Extruded | 49.67 | 145.90 |
| Skin Thickness (inches) | 0.0190 | 0.1290 |
| Thermal Stability (% change) | | |
| cmd | −4.0 | −0.2 |
| md | −1.8 | −0.7 |
| thick | −18.1 | −2.8 |
| weight | −3.7 | −0.1 |
| Comp. Creep @ 1 week (% loss) @ 2.0 psi loading | | |
| Vertical | 0.55 | 36.3 |
| Horizontal | 1.49 | 2.49 |
| Extruded | 1.11 | 0.97 |
| Tensile Strength (psi) | | |
| cmd | 29.8 | 49.3 |
| md | 39.5 | 62.3 |
| Tensile Strength (lbs force) | | |
| cmd | 7.23 | 11.84 |
| md | 9.55 | 15.25 |
| Tensile Modulus (psi) | | |
| cmd | 165.0 | 381.4 |
| md | 241.2 | 574.0 |
| Tensile Elongation (%) | | |
| cmd | 79.0 | 63.9 |
| md | 87.3 | 63.3 |
| Tensile Strength Hinge (psi) | | |
| cmd | 308.6 | 133.8 |
| md | 421.6 | 154.6 |
| Tensile Strength of Hinge (lbs force) | | |
| cmd | 2.93 | 8.63 |
| md | 4.01 | 9.97 |
| Tensile Modulus Hinge (psi) | | |
| cmd | 2681 | 1383 |
| md | 3991 | 1662 |
| Tensile Elongation of Hinge (%) | | |
| cmd | 24.0 | 28.4 |
| md | 27.0 | 25.0 |
| Shear Strength of Hinge (psi) | | |
| cmd | 13867 | 6110 |
| md | 17503 | 6565 |
| Shear Strength of Hinge (lbs force) | | |
| cmd | 13.17 | 39.47 |
| md | 16.63 | 42.34 |
| Modulus in Shear (psi) | | |
| cmd | 163545 | 83284 |
| md | 106072 | 92846 |
| Hinge Fatigue (cycles to break) | | |
| cmd | 100 (no break) | 100 (no break) |
| md | 100 (no break) | 100 (no break) |
| Dynamic Cushioning (G's) Average of 2$^{nd}$–5$^{th}$ Drops | | |
| 1.0 psi static load | 42.0 | 51.3 |
| 2.0 psi static load | 62.5 | 90.8 |

All shear properties are tested according to ASTM D3163, modified for plastic foam testing. In general, both the foam plank of Example 1 with densified skins and the multi-density foam sheet laminate (MDL) product possess properties which make them suitable for protective packaging applications. In particular, both products are suitable for packaging applications containing collapsible packing members that can be rotated about a strong hinge point to form an integral end cap for electronic and other goods cushioning protection. One significant advantage of the densified skin foam plank of Example 1 over the MDL product is that it possesses superior dynamic cushioning performance, as shown at the bottom of Table 2 above.

While the present invention has been described with reference to one or more particular embodiments, those skilled in the art will recognize that many changes may be made thereto without departing from the spirit and scope of the present invention. For example, the heating sources implemented at the heating stations may comprise virtually any type or combination of heating sources. Additionally, thicknesses of the core and densified skins may vary greatly. Most importantly, it is possible to create structures similar to those described herein by densifying the outside skins of laminated plank. Laminating together individual sheets or rolls of ethylene polymer foam sheet using heat, adhesives, or other means produces laminated plank. While this would require separate handling of the sheet and laminated plank, the resulting structure would be equivalent to the present invention. In addition, it is also possible to densify the skin of an individual foam sheet layer as it is being produced on a foam sheet line utilizing the techniques described herein. The densified skin foam sheet rolls or sheets can be laminated with other non-densified skin foam sheet rolls or sheets to produce structures equivalent to what is described herein. Each of these embodiments and obvious variations thereof are contemplated as falling within the spirit and scope of the claimed invention.

The following examples are provided for additional illustrative purposes, but the invention described herein should not be considered limited thereto.

EXAMPLE 1

Pellets of Westlake 606 low density polyethylene (specific gravity, 0.916 g/cm$^3$; melt index, 2.3 grams/10 minutes) and Schulman F20V crystalline silica concentrate based in low density polyethylene are fed into a 48: 1, L/D Wilmington, 3.0 inch (76 mm) single screw extruder operating at an average of 34 revolutions per minute and melted. A31 isobutane, pressurized to 1800 psi, is added to the melted polymer through an injection port in the second zone of the extruder at 7.5 parts per hundred by weight of polymer. Liquefied permeation modifier, Pationic 1052 (blend of mono, di and tri glycerol stearates), is also injected in the second zone of the extruder at 1.0 part per hundred by weight of polymer. The isobutane blowing agent, permeation modifier, and melted polymer are mixed and subsequently cooled to a melt temperature of 215° F. The extruder head pressure is regulated by a Normag 2200 gear pump pressure control system. The gear pump is operating at 16.8 revolutions per minute and delivers the mixed melt to a temperature controlled, hydraulically pressurized piston chamber at a pressure of 300 psi.

When the material filling the chamber moves the piston a predefined distance, a limit switch activates both the drive system and the die gate system, allowing the piston to eject the material through a radial die having a cross sectional area of 1.0 in$^2$, at a rate of 6025 lb/hr. The resulting foam plank has a fresh density of 2.25 lb/ft3, a linear cell count of 20 cells per inch, a width of 24 inches, and a thickness of 2.375 inches. Following a stabilization period in a forming table for 5 minutes, the plank is conveyed to an integral heating/edge trimming station.

The heating station has one heating zone comprised of two side by side Leister model CH-6056 hot air guns, each capable of supplying 550 liters per minute of hot air at a 2 millibar back pressure. Each 220 volt Leister unit has a 3400 watt heater and a 12 inch wide nozzle with a 1/32 inch to 3/32 inch dogbone gap. The hot air gun nozzle discharges are positioned 3 inches above the surface of a drive belt along which the plank is fed. Therefore, the heating station is set up for one-sided skin densification only. A pressure regulated roller is positioned immediately after the Leister hot air nozzles at an initial gap of 2.25 inches above the drive belt.

Plank is fed through the heating station/edge trimming assembly at a speed of 20 feet per minute where the plank is trimmed to a width of 18 inches and the initial skin densification occurs on the top side of the plank only. The discharge temperature of the heated air from the Leister hot air nozzles is controlled at 600° F. To simulate multiple heating zones, the plank is immediately fed back through the heating station assembly multiple times, with the same side positioned to the top, until no further skin densification occurs. Following a total of two passes through the heating station, the top skin of the densified skin plank has a thickness of 19 mils at a density greater than 40 lb/ft$^3$. Following a total of four passes through the heating station, the top skin of the densified skin plank has a thickness of 20 mils at a density greater than 45 lb/ft$^3$. Following a total of five passes through the heating station, the top skin of the densified skin plank has a thickness of 22 mils at a density greater than 50 lb/ft$^3$.

EXAMPLE 2

Commercially available polyethylene foam plank (2.125 inches thick, 108 inches in length, 24 inches wide) made by an accumulating extrusion process similar to what is discussed in Example 1 above, except that the density of the plank is 1.7 lb/ft$^3$ and it has been colored dark blue, is fed to the heating station/edge trimming assembly described in Example 1. The plank has been aged under ambient conditions of polymer. The isobutane blowing agent and melted polymer are mixed and subsequently cooled to a melt temperature of 215° F. The extruder head pressure is regulated by a Normag 2200 gear pump pressure control system. The gear pump is operating at 16.8 revolutions per minute and delivers the mixed melt to a temperature controlled, hydraulically pressurized piston chamber at a pressure of 400 psi.

When the material filling the chamber moves the piston a predefined distance, a limit switch activates both the drive system and the die gate system, allowing the piston to eject the material through a radial die having a cross sectional area of 1.0 in$^2$, at a rate of 7100 lb/hr. The resulting foam plank has a fresh density of 1.39 lb/ft3, a linear cell count of 22 cells per inch, a width of 24 inches, and a thickness of 2.5 inches. Following a stabilization period in a forming table for 4 minutes, the plank is conveyed to an integral heating/edge trimming station as described in Example 1.

Plank is fed through the heating station/edge trimming assembly at a speed of 20 feet per minute where the plank is trimmed to a width of 18 inches and the initial skin densification occurs on the top side of the plank only. The discharge temperature of the heated air from the Leister hot air nozzles is controlled at 600° F. The plank is immediately fed back through the heating station assembly multiple times, with the same side positioned to the top, until no further skin densification occurs. Average total plank thickness is recorded initially and following each pass through the heating station assembly as a measure of the skin densification. Following three passes through the heating station assembly, the average plank thickness is 2.25 inches, equating to a densified skin thickness of 12.5 mils at a skin density greater than 50 lb/ft$^3$.

EXAMPLE 3

Densified foam plank is prepared according to Example 3 except the clearance between the heated air nozzles and the driven conveyor belt has been reduced to 2.75 inches (0.25 inch reduction) putting the nozzle discharge within 0.25 inches of the plank surface during the first pass through the heating station. Following three passes through the heating station assembly, the average plank thickness is 2.20 inches, equating to a densified skin thickness of 13.5 mils at a skin density greater than 50 lb/ft$^3$.

EXAMPLE 4

Densified foam plank is prepared according to Example 4 except the clearance between the nip roller and the driven conveyor belt has been reduced to 2.00 inches (0.25 inch reduction) thereby increasing the pressure on the foam as it exits the area immediately adjacent to the heated air nozzles. Following three passes through the heating station assembly, the average plank thickness is 2.125 inches, equating to a densified skin thickness of 16.5 mils at a skin density greater than 50 lb/ft$^3$.

What is claimed is:

1. A densified skin polyolefinic foam plank comprising an extruded low density polyolefinic foam made of a polymeric melt and having dimensionally stable closed cells, said foam having a top surface, a bottom surface and a core, at least one of said top surface and said bottom surface having a densified skin comprising melted and collapsed foam cells formed by heating said at least one surface, said densified skin having a density at least ten times greater than a density of the core of the polyolefinic foam and a thickness of about 12.5 mils to about 100 mils, wherein the foam plank includes a slit extending from the surface opposite the densified skin through at least part of the core so that the uncut densified skin forms a hinge and wherein one or more portions of the plank rotates around the hinge.

2. The plank of claim 1, wherein the slit extends through the entire thickness of the core but not into the densified skin.

3. The plank of claim 1, wherein the slit extends partially through the densified skin.

4. The plank of claim 1, wherein said plank has a density between about 0.9 lb/ft$^3$ and 5 lb/ft$^3$.

5. The plank of claim 1, wherein said plank has a thickness greater than 1 inch.

6. The plank of claim 1, wherein said low density polyolefinic foam is a low density ethylene polymer foam.

7. The plank of claim 1, wherein said densified skin is provided only on the top surface, the bottom surface, or both the top and bottom surfaces of the foam plank.

* * * * *

UNITED STATES PATENT AND TRADEMARK OFFICE
CERTIFICATE OF CORRECTION

PATENT NO. : 7,201,958 B2
APPLICATION NO. : 10/770958
DATED : April 10, 2007
INVENTOR(S) : Stimler et al.

It is certified that error appears in the above-identified patent and that said Letters Patent is hereby corrected as shown below:

Column 4:
Line 43, delete "50, 52, 54 and 56" and insert -- 60, 62, 64 and 66 --.
Line 44, delete "58, 62 and 66" and insert -- 68, 72 and 76 --.
Line 45, delete "60, 64 and 68" and insert -- 70, 74 and 78 --.
Line 48, delete "58–68" and insert -- 68–78 --.
Line 50, delete "58–68" and insert -- 68–78 --.

Column 16:
Line 59, after "Densified foam plank is prepared according to Example", delete "3" and insert -- 2 --.

Column 17:
Line 3, after "Densified foam plank is prepared according to Example", delete "4" and insert -- 3 --.

Signed and Sealed this

Fifteenth Day of May, 2007

JON W. DUDAS
*Director of the United States Patent and Trademark Office*